Patented May 6, 1952

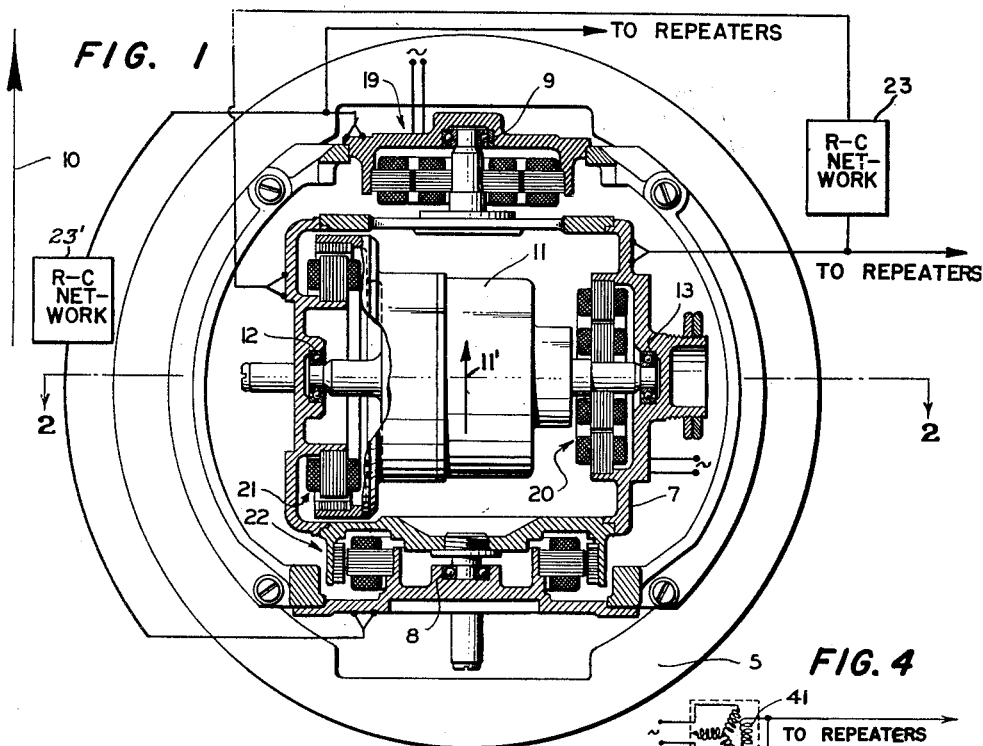

2,595,268

UNITED STATES PATENT OFFICE 2,595,268

INSTRUMENT PROVIDING A VERTICAL
REFERENCE FOR DIRIGIBLE CRAFT

Spencer Kellogg, 2nd, Glen Head, N. Y., assignor
to The Sperry Corporation, a corporation of
Delaware Application October 26, 1946, Serial No. 705,878

16 Claims. (Cl. 74—5.7)

1

This invention relates to an instrument that provides a true vertical reference for dirigible craft. According to my invention I have devised a gyroscopic apparatus having a pendulous or other gravitational factor forming a part thereof or affixed thereto, in which there is brought into action, whenever lateral acceleration forces arise (such as due to turning or change of speed of the vehicle on which the apparatus is mounted), a factor which opposes and renders ineffective such acceleration forces. For this purpose, my improved instrument utilizes the precession of a gyroscope of the rate of turn or two degrees of freedom type during turns of the craft to nullify the effect of centrifugal force acting on the pendulous factor and otherwise causing it to swing out, away from the vertical. By balancing these two opposing factors, the pendulum is caused to remain undisturbed during a turn. Since, however, the centrifugal force is proportional to both rate of turn and speed ($F=K\theta s$) for accurate results, the opposing precessional force of the gyro should be varied with changes in air speed, which is readily accomplished by keeping the rotor speed proportional to true air speed. With my invention I also prevent the pendulous factor from becoming displaced during linear acceleration, i. e., change of speed in the direction of flight, as well as during turns. This is accomplished by a special construction of the gyroscope described hereinafter, in connection with changing the rotor speed of the gyroscope to maintain it proportional to air speed. I am aware that a part of my arrangement has been proposed in the prior art, as for instance in the prior patent to E. A. Sperry, 1,880,994, dated October 4, 1932, but such prior art arrangements failed to come into use partly because the arrangements proposed took care of errors due to turns only.

A primary object of my invention, therefore, is to prevent a pendulum or other gravitational responsive element from departing from the vertical or other reference position under the action of both types of lateral acceleration forces, such as due to turning of the craft in flight or change of speed of the craft, or both.

One of the features of the invention consists in the provision of a pendulous reference element for the instrument that is universally mounted.

Another feature of the invention resides in the provision of a pendulous gyro rotor case for the reference element of the instrument.

Still another feature of the invention is provided by an air-tight rotor case for housing the gyro rotor of the instrument.

2

The invention in another of its aspects relates to novel features of the instrumentalities described herein for achieving the principal objects of the invention and to novel principles employed in those instrumentalities, whether or not these features and principles are used for the said principal object or in the said field.

A further object of the invention is to provide improved apparatus and instrumentalities embodying novel features and principles, adapted for use in realizing the above objects and also adapted for use in other fields.

Other objects, features and structural details of the invention will be apparent from the following description when read in relation to the accompanying drawings, wherein:

Fig. 1 is a plan view, partly in section, of a vertical reference instrument embodying the present invention concepts.

Fig. 2 is a vertical section of the instrument taken on lines 2—2 in Fig. 1.

Fig. 3 is a schematic view and circuit diagram showing a means for varying the speed of the gyro rotor in accordance with change in speed of the craft on which the instrument is employed along its fore and aft axis, and Fig. 4 is a circuit diagram showing the means for damping the pendulum about its athwartship axis.

With reference to the drawings, the gyro compensated pendulum embodying the present inventive concepts is shown to include a casing having a base 5 and cover 6 that are suitably secured together. A gimbal ring 7 is pivotally mounted on the base 5 by means of bearings 8 and 9 which supports the same for movement about a normally horizontal axis that is substantially parallel to, or coaxial with, the fore and aft axis of the dirigible craft on which the instrument is used. Arrow 10, in Fig. 1, indicates the direction of the fore and aft axis of the dirigible craft. In turn, the gimbal ring 7 supports the reference element of the instrument indicated at 11 for movement about a normally horizontal axis defined by bearings 12 and 13 perpendicular to the axis of the ring 7 and normally parallel to the athwartship axis of the craft.

The reference element 11 carried by the gimbal ring 7 may be termed a pendulous mounting, a pendulum or a pendulous gyro rotor case, which terminology is used interchangeably in the application. As shown, element 11 is made pendulous by means of weight 24, Fig. 2, so the same may be considered as a pendulum that pivots about the horizontal axis defined by bearings 12, 13. Element 11 may also be considered to be a gyro rotor case as the same provides a pendulous housing or air-tight enclosure for a gyro rotor 14, Fig. 2, mounted to spin about an axis coincident with the horizontal axis of the element defined by bearings 12, 13. As shown, the rotor 14 is adapted to spin about an axis defined by bearings 15 and 16. The gyro rotor 14 may therefore be considered to be supported by a pendulum or pendulous mounting with the axis of the rotor coaxial with the axis of the pendulum or pendulous mounting.

The pendulum or pendulous rotor case 11 provides the vertical reference and this element of the instrument is compensated for changes in velocity of the craft along its fore and aft or longitudinal axis by balancing the torque on element 11 about the horizontal axis defined by bearings 12, 13 due to the tendency of the element to swing away from its normal vertical position about the same axis under linear acceleration, with a torque about the same axis caused by changing the speed of the rotor 14 with the change in velocity of the craft. This changes the angular momentum of the gyro rotor and the reactive torque on the stator 25' causing such change acts to prevent the pendulum from moving about the axis thereof parallel to the athwartship axis of the craft when the craft changes speed along its fore and aft axis, assuming the rotor to be spinning with its top moving in the direction of flight, as shown by the arrow 11' on casing 11 in Fig. 1. The preferred means provided to spin the gyro rotor 14 so that the speed thereof varies with the speed of the craft is shown in Fig. 3 to include a motor 25 whose stator forms a part of the reference element 11. Motor 25 may be a synchronous motor of known design whose speed varies with the frequency input thereto which is supplied through an amplifier 26 from a three phase alternator 27 whose permanent magnet rotor is rotated by a windmill or fan 29, which is located in the slip stream and is thus driven at a speed proportional to the true air speed of the craft. The purpose of the amplifier or relay 26 between the generator 27 and the motor 24, is to reduce the load on the generator to a minimum, so that its speed may change quickly with changes of speed of the craft, that is, so that the rotor speed of the aircraft may be kept in close synchronism with the speed of the aircraft even during rapid changes. By employing a power amplifier, the generator 27 may be of very small power, resembling an electric tachometer.

In the improved instrument, the tendency of the pendulum or case 11 to swing about the axis defined by bearings 8, 9 with turn of the craft about its vertical axis is balanced by precession of the gyro about axis 8, 9 as may be seen from the following analysis.

The two degrees of freedom of the rate gyroscope may be regarded as provided by the main fore and aft trunnion axis 8, 9 and by either or both of the aligned pairs of bearings 15, 16 or 12, 13, one of which is, of course, the spin axis of the rotor. When the craft turns, the action of centrifugal force on the pendulous factor 24 will tend to cause the pendulum to swing toward the outside of the turn about axis 8, 9. On the other hand, the force due to turning of the axis 8, 9 about an axis perpendicular to the plane of the paper in Fig. 2 (i. e., a vertical axis), will cause the gyro to tend to precess about the trunnion axis 8, 9, and thereby exert a force on the pendulum with the gyro spun in the direction shown, opposing the centrifugal force on the pendulum. With the gyroscopic and pendulous factors properly chosen, these forces may be made to balance provided the precessional force is varied with air speed. This is readily accomplished by maintaining the rotor speed proportional to air speed, as by means of the synchronous motor 25 and the wind driven generator 27 or equivalent means, as above explained.

It is therefore apparent that by my invention, I not only prevent deviation of a pendulous or other gravitational element during turns, but also during changes of speed, so that my improved gyro pendulum arrangement will maintain a true vertical under all ordinary conditions of flight.

Another and perhaps more scientific method of defining the above desired relationship is to state that the moment of inertia, rotor speed and pendulosity of the gyroscope are so designed and governed that, under the coercion of centrifugal forces on the gyro acting through the pendulous factor, the gyro will precess in azimuth at the same rate that the craft is turning and hence no disturbing torque reaches the gyro through its trunnions.

An indication of the reference provided by the improved instrument may be obtained by the use of repeaters (not shown) operated in a manner known in the art from the output of the selsyn transmitters or generators shown generally in the drawing at 19 and 20. Generator 19 provides an output in accordance with departure of the gimbal ring 7 from its reference position with respect to the casing for the instrument. Generator 20 operates in a similar manner to detect or measure departure of element 11 from the reference position about the axis defined by the bearings 12, 13 of the instrument.

For damping the oscillations of the gyroscope, I have provided a novel electrical damper which may be actuated from the output of transformers or pick-offs 19—20 or auxiliary electrical pick-offs. Such devices give a signal proportional to the relative displacement of the gyro and the reference with which it is compared; in this instance, its support. In Fig. 4 two of the stationary coils 40 of the transmitter 20 are shown as supplied with single phase alternating current, so that the output of the coil 41 secured to the gyro casing 11 is of reversible phase and of a magnitude dependent upon the direction and amount of displacement between the support and gyroscope. To secure damping part of the output is led through an RC (resistance-condenser) differentiating network 23, which is now well known in the art, examples of which are disclosed in the patents to H. L. Hull, No. 2,233,415, dated March 4, 1941 for Positional Control System and Moseley et al., No. 2,139,558, dated December 6, 1938 for Follow-up Systems for Gyro Compasses.

The output of this network is therefore substantially proportional to the rate of relative movement of the gyro and this is shown as supplied to torque motor 12 acting about axis 12, 13 to oppose such motion. By this means the necessity for viscous dampers with changing coefficients of viscosity is eliminated. A similar damper may be provided about the other axis 8, 9 by connecting the output of the transmitter 19 differentiated by RC network 23' similar to network 23 to a torquer 22.

The effect of windage due to the spinning gyro rotor 14 on the gimbal housing 11, i. e., upon the vertical position of the pendulum 24, is prevented in the present construction by forming the rotor case, pendulous mounting or pendulum of the instrument in such form that the same completely houses or encloses the rotor and is substantially air-tight to form a closed system. By such an arrangement, the reactive effect of the stator 25' of the motor 25 does not disturb the vertical position of the pendulum 24 because it is well known that in a closed system all forces cancel. In other words, the reactive effect on the stator of the spinning torque under constant speed conditions is due entirely to the friction drag in the bearings and windage in the case, which therefore cancel one another in their overall effect upon the position of the pendulous gimbal housing 11. When the stator is causing the motor to accelerate or decelerate, however, there is a marked reactive effect upon the mounting 11 which would otherwise tend to displace the pendulum 24, but which is opposed by the action of the linear acceleration force acting on the pendulous factor at the time, as explained.

Since many changes could be made in the above construction and many apparently widely different embodiments of this invention could be made without departure from the scope thereof, it is intended that all matter contained in the above description or shown in the accompanying drawings shall be interpreted as illustrative and not in a limiting sense.

What is claimed is:

1. An instrument providing a vertical reference for dirigible craft including, in combination, a gimbal ring pivotally mounted on the craft for movement about an axis parallel to the fore and aft axis of the craft, a pendulum pivotally supported on said ring about an axis normally parallel to the athwartship axis of the craft, and a gyro rotor journalled in said pendulum for spinning about an axis coincident with said axis of the pendulum, means for spinning said rotor, including means for varying the speed of said rotor in accordance with the speed of the craft.

2. An instrument providing a vertical reference for dirigible craft including, in combination, a gimbal ring mounted in the craft for movement about a normally horizontal axis, a pendulum carried by said ring pivotally supported about a normally horizontal axis perpendicular to the axis of said ring, a gyro rotor mounted on said pendulum to spin about an axis coincident with the axis of the pendulum, and means for spinning said gyro rotor at a speed that varies with the speed of the craft.

3. An instrument as claimed in claim 2, in which said pendulum provides a universally mounted air-tight housing for said gyro rotor.

4. An instrument providing a vertical reference for dirigible craft including, in combination, a gimbal ring mounted in the craft for movement about a normally horizontal axis, an airtight, pendulous, gyro rotor case carried by said ring pivotally supported about a normally horizontal axis perpendicular to the axis of said ring, a gyro rotor mounted in said case to spin about an axis coincident with the axis of said case, and variable means for spinning said gyro rotor so that the speed thereof varies with the speed of the craft.

5. In a gyro compensated pendulum, the combination of, a gimbal ring supported for movement about a normally horizontal axis, a pendulous mounting pivoted in said gimbal ring for freedom about a normally horizontal axis perpendicular to the axis of said ring, and a gyro rotor journalled in said mounting with its spin axis fixed in line with said second axis.

6. In an instrument providing a vertical reference for dirigible craft, the combination of, a gimbal ring mounted on the craft for movement about an axis substantially parallel to the fore and aft axis of the craft, a pendulum carried by said ring pivotally supported about an axis normally parallel to the athwartship axis of the craft, a gyro rotor supported by said pendulum to spin about an axis coaxial with the axis of the pendulum, and means for varying the speed of the rotor proportionally and coincidentally with changes of speed of the craft.

7. In a gyro compensated pendulum, the combination of, a gimbal ring pivotally supported for movement about a normally horizontal axis, an air-tight pendulous housing carried by said ring pivotally supported about a normally horizontal axis perpendicular to the axis of said ring, and a gyro rotor enclosed within and supported by said housing to spin about an axis coaxial with the axis of the housing.

8. In a gyro compensated pendulum, the combination of, a gimbal ring pivotally supported for movement about a normally horizontal axis, an air-tight, pendulous, gyro rotor case carried by said ring pivotally supported about a normally horizontal axis perpendicular to the axis of said ring, and a gyro rotor mounted in said case to spin about an axis coaxial with the axis of the case.

9. In an instrument providing a vertical reference for dirigible craft, a gimbal ring supported pendulum movable about normally horizontal axes normally perpendicular and parallel to the athwartship axis of the craft, a gyro rotor carried by said pendulum to spin about an axis coaxial with the axis of the pendulum, and means for varying the speed of the rotor proportionally and coincidentally with changes of speed of the craft.

10. In a gyro compensated pendulum, a pendulous gyro rotor case movable about a normally horizontal axis and a gyro rotor mounted in said case to spin about an axis coaxial with the axis of said case, said case providing an air-tight enclosure for the gyro rotor.

11. In an instrument providing a vertical reference for dirigible craft, a pendulum supported on an axis parallel to the athwartship axis of the craft, a gyro rotor carried by said pendulum to spin about the axis of the pendulum, and means for changing the speed of the gyro rotor with change in speed of the craft along its fore and aft axis, said speed changing means varying the angular momentum of the gyro rotor to prevent the pendulum from moving about its axis due to the change in speed of the craft.

12. In a gyro compensated pendulum, a pendulum supported for movement about two mutually perpendicular, normally horizontal, axes, a gyro rotor carried by said pendulum to spin about one of the axes of the pendulum, means for damping the pendulum about one of its axes, and means for damping the pendulum about the other of its axes, comprising a pick-off providing a signal responsive to displacement of the pendulum about an axis, means for producing a signal proportional to the rate of change of the signal of said pick-off, and a motor connected to move the pendulum about the axis of the pick-off operated by the output of said producing means.

13. An electrical damping means for gyroscopes and the like, comprising the combination with a gyroscope mounted for oscillation about an axis, of electrical signal producing means responsive to relative movement of the gyroscope about such axis producing a signal proportional to such displacement, an electrical network for differentiating such signal, a torque motor operative about such axis and means for actuating said torque motor from said differentiated signal for damping the gyroscope about said axis.

14. A gyro-compensated pendulum for craft comprising a universally gimballed pendulous mount pivotally supported about two mutually perpendicular horizontal axes, a gyro rotor journalled in said mount with its spin axis in line with one of said other axes, and variable means for spinning the rotor at a speed variable with the craft's speed; the gyro-moment, rotor speed and pendulosity being so constructed and arranged that deviations due to acceleration forces acting on the pendulum are nullified, during turns by gyroscopic precession, and during change of speed by rotor spinning torque reaction.

15. In a gyro compensated pendulum, a pendulum supported for movement about two mutually perpendicular, normally horizontal, axes, a gyro rotor carried by said pendulum to spin about one of the axes of the pendulum, an A. C. transmitter acting about each of said axes for transmitting to a distance the position of said pendulum, electrical damping means acting about each of said axes, and differentiating means actuated from the output of the respective transmitters for controlling said damping means.

16. A damper for gyroscopes of the rate of turn, or two degrees of freedom type, an alternating current signal generator connected to at least one of the trunnions of such a gyroscope, having an output variable with the tilt of said gyroscope about said trunnion, a rate taking differentiating network connected to said output and an electrical torquer also connected to at least one of said trunnions for damping the gyroscope, said torquer being energized by the output of said network.

SPENCER KELLOGG, 2ND.

REFERENCES CITED

The following references are of record in the file of this patent:

UNITED STATES PATENTS

| Number | Name | Date |
|---|---|---|
| Re. 20,701 | Gillmor | Apr. 19, 1938 |
| 865,277 | Stannard | Sept. 3, 1907 |
| 865,278 | Stannard | Sept. 3, 1907 |
| 1,086,242 | Sweeny | Feb. 3, 1914 |
| 1,137,258 | Chessin | Apr. 27, 1915 |
| 1,148,154 | Dieter | July 27, 1915 |
| 1,308,693 | Beattie | July 1, 1919 |
| 1,679,354 | Fairchild et al. | Aug. 7, 1928 |
| 2,181,250 | Reichel | Nov. 28, 1939 |
| 2,293,039 | Esval | Aug. 18, 1942 |
| 2,338,098 | Davis | Jan. 4, 1944 |
| 2,351,619 | Kimball | June 20, 1944 |